(12) United States Patent
Tamamura

(10) Patent No.: US 7,536,796 B2
(45) Date of Patent: May 26, 2009

(54) LASER MARKER

(75) Inventor: Akihito Tamamura, Machida (JP)

(73) Assignee: Kabushiki Kaisha Audio-Technica, Machida-shi (JP)

( * ) Notice: Subject to any disclaimer, the term of this patent is extended or adjusted under 35 U.S.C. 154(b) by 28 days.

(21) Appl. No.: 11/933,709

(22) Filed: Nov. 1, 2007

(65) Prior Publication Data

US 2008/0209745 A1 Sep. 4, 2008

(30) Foreign Application Priority Data

Nov. 1, 2006 (JP) ............................. 2006-297634

(51) Int. Cl.
*G01C 15/00* (2006.01)
(52) U.S. Cl. .................... 33/291; 33/DIG. 21
(58) Field of Classification Search .................. 33/290, 33/291, DIG. 21
See application file for complete search history.

(56) References Cited

U.S. PATENT DOCUMENTS

| 6,101,728 | A | * | 8/2000 | Keng ...................... 33/DIG. 21 |
| 6,536,122 | B2 | | 3/2003 | Tamamura |
| 6,546,636 | B2 | | 4/2003 | Tamamura |
| 6,691,420 | B2 | | 2/2004 | Tamamura |
| 6,718,643 | B2 | | 4/2004 | Tamamura |
| 7,441,339 | B2 | * | 10/2008 | Kallabis ................. 33/DIG. 21 |
| 2002/0138997 | A1 | * | 10/2002 | Ohtomo et al. ............... 33/290 |
| 2005/0166409 | A1 | * | 8/2005 | Chou et al. ................... 33/290 |
| 2007/0044333 | A1 | * | 3/2007 | Qi et al. ........................ 33/291 |

FOREIGN PATENT DOCUMENTS

| JP | 2000-193455 | 7/2000 |
| JP | 2001-324325 | 11/2001 |
| JP | 2005-300406 | 10/2005 |
| JP | 2006-113033 | 4/2006 |

\* cited by examiner

*Primary Examiner*—G. Bradley Bennett
(74) *Attorney, Agent, or Firm*—Oblon, Spivak, McClelland, Maier & Neustadt, P.C.

(57) ABSTRACT

To obtain a laser marker capable of effectively reducing an impact force applied to essential components of the laser marker including a gimbal mechanism, a light source unit holder, and a light source unit when the laser marker falls, and in particular, capable of reducing damage to the gimbal mechanism, a main body case including a gimbal mechanism, a light source unit holder suspended swingably by the gimbal mechanism, light source units attached to the light source unit holder and outputting a projection line beam, a base supporting the main body case, and a plurality of legs provided at the bottom of the base and supporting the base are provided, and the base and each leg are coupled via an elastic body that bends when an impact in the vertical direction is applied.

10 Claims, 4 Drawing Sheets

LASER MARKER

BACKGROUND OF THE INVENTION

1. Field of the Invention

The present invention relates to a laser marker that projects a reference line, such as a vertical line, horizontal line, etc., onto a target surface of projection, such as a ceiling, wall, floor, etc., using a laser beam on a construction site etc. and, more particularly, the present invention is characterized by an impact-resistant structure that protects an internal mechanism including highly precisely machined parts and adjusted with precision from an impact when it falls.

RELATED BACKGROUND OF THE INVENTION

On a construction site etc., an optical marker is used that projects a vertical line beam or a horizontal line beam, which serves as a reference of verticality or horizontality of an object, such as a pillar, wall, etc. Almost all the light sources of the optical markers are semiconductor lasers and therefore an optical marker is generally referred to as a laser marker. In a laser marker, a light source unit holder is suspended like a pendulum so that it can always take an attitude in the vertical direction by a mechanism, called as a gimbal mechanism or gyro mechanism (hereinafter, referred to as a "gimbal mechanism") and a light source unit including a semiconductor laser held by the light source unit holder. A light source unit has a semiconductor laser as a light source, a collimate lens that transforms divergent beams emitted from the semiconductor laser into a parallel beam flux, and a rod lens that diffuses the parallel beam flux only in one direction. The parallel beam flux enters the rod lens from the direction perpendicular to the center axis line thereof and thereby it is refracted by the rod lens and diffused in a sector shape only in the direction perpendicular to the center axis line. By irradiating a target surface of projection, such as a wall surface, ceiling surface, floor surface, etc., with the diffused light beams, a straight line can be drawn by light beams. It is possible to irradiate a line beam in the vertical direction by attaching the light source unit to the light source unit holder so that the center axis line of the rod lens is horizontal. In addition, it is possible to project a line beam in the horizontal direction by attaching the light source unit to the light source unit holder so that the center axis line of the rod lens is vertical. The principles of a laser marker are described as above.

In the laser marker, as described above, the light source unit holder that holds the light source unit is supported swingably by the gimbal mechanism. It is necessary for the laser marker to project line beams in the vertical direction or the horizontal direction with precision, and therefore, it is desired that the frictional resistance of the gimbal mechanism is as small as possible and the light source unit holder is always kept in a predetermined attitude in the vertical direction. Therefore, the bearing part of the gimbal mechanism is configured mainly by, in general, a ball bearing and a shaft rotatably supported by the ball bearing. However, as the ball bearing used in the gimbal mechanism of the laser marker, the one with a frictional resistance as small as possible is selected, and therefore, there arises a problem of impact resistance. In other words, there is a problem that if the laser marker in use falls accidentally even from a height of about, for example, 10 cm, the bearing part is damaged by the impact force, the frictional resistance increases, and the accuracy of the line beam to be projected is lowered.

Despite the fact that the laser marker has such a problem, a user is likely to use it carelessly on a construction site etc. because he/she regards it as one of electric motor tools, and therefore, most of the causes of trouble are falls and most of repair requests result from falls. The laser marker belongs to a group of precision tools and its repair requires an overhaul, reconstruction after repair, and adjustment, thus resulting in a high repair cost. It is desirable for a user of the laser marker if damage due to a fall can be reduced, if any. In such circumstances, there have been proposed a variety of impact resistant structures and buffering structures of the laser marker as described in Patent Documents 1 to 4 below.

In the laser marker described in Patent Document 1, a lock mechanism is devised, which locks the light source unit holder when not in use to prevent it from swinging, wherein the lock mechanism has a lock member having a cone-shaped receiving part for covering the lower-end periphery of the light source unit holder and a lock member moving mechanism that vertically moves the lock member and stops the vertical and horizontal motion of the light source unit holder by pressing the receiving part to the lower-end periphery of the light source unit holder, and the lock member moving mechanism has an elastic body and the lock member moves vertically with interposition of the elastic body.

In the laser marker described in Patent Document 2, an elastic body, having two holding pieces is provided in a swinging body, and a laser beam emitting device, namely a laser light source is mounted between the two holding pieces so as to widen the interval between the holding pieces. Although the direct object of the invention described in Patent Document 2 is not to provide impact resistance, the two holding pieces included in the elastic body function as a buffering member for the laser light source and have an effect to protect the laser light source from an impact.

In the laser marker described in Patent Document 3, a buffering mechanism is incorporated in the attachment part of the gyro (corresponding to the gimbal mechanism) that suspends a light source unit holder swingably. Specifically, the gyro attaching block is constructed by the right and left side plates on which the upper attachment surface and the lower attachment surface are formed by bending the upper end part and the lower end part transversely at right angles, the top plate that connects the tops of the right and left side plates, and the cushioning member interposed between each top of the right and left side plates and each end part of the top plate, and the gyro is arranged at the top plate.

The laser marker described in Patent Document 4 has a support base, a gimbal mechanism, a light source unit holder supported on the support base via the gimbal mechanism, a light source unit attached to the light source unit holder, and a casing covering the essential components and is characterized in that a damping member is interposed between the support base and the casing.

[Patent Document 1] Japanese Patent Laid-Open No. 2001-324325

[Patent Document 2] Japanese Patent Laid-Open No. 2000-193455

[Patent Document 3] Japanese Patent Laid-Open No. 2006-113033

[Patent Document 4] Japanese Patent Laid-Open No. 2005-300406

SUMMARY OF THE INVENTION

In the invention described in Patent Document 1, the elastic body is used in the lock member that prevents the light source unit holder from moving when not in use and thus an impact is reduced, however, buffering has not been taken into consideration when an impact is applied when in use with the lock released.

Although the invention described in Patent Document 2 has the buffering effect of the laser light source, it does not have a technical concept of buffering the essential components of the laser marker, including the gimbal mechanism, the light source unit holder, and the light source unit.

In the invention described in Patent Document 3, the top plate constituting the gyro attaching block is attached via the cushioning member and the gyro is attached to the top plate, and thus the effect that the essential components of the laser marker can be buffered is brought about. However, when the laser marker falls, it is not possible to sufficiently exhibit the buffering effect only by the configuration in which the gyro attaching block is attached via the cushioning member.

In the invention described in Patent Document 4, the damping member is interposed between the support base and the casing and thereby the buffering effect can be expected to a certain degree. In addition, the base and the support base are coupled by the impact blocking structure and thereby the buffering effect against the impact in the vertical direction can be expected to a certain degree. However, it is not possible to obtain a sufficient buffering effect only by the impact-resistant structure described in Patent Document 4, and it is desired to realize a more effective impact-resistant structure or buffering structure in addition to the impact-resistant structure described in Patent Document 4, or in combination with the impact-resistant structure described in Patent Document 4.

An object of the present invention is to solve the problems in the prior art described above. In other words, an object thereof is to obtain a laser marker capable of effectively reducing the impact force applied to the essential components of the laser marker, including the gimbal mechanism, the light source unit holder, and the light source unit, and particularly, capable of reducing damage to the gimbal mechanism when the laser marker falls.

The present invention is a laser marker comprising: a main body case including a gimbal mechanism, a light source unit holder suspended swingably by the gimbal mechanism, and a light source unit attached to the light source unit holder and outputting a projection line beam; a base supporting the main body case; and a plurality of legs provided at the bottom of the base and supporting the base, the base and the each leg being coupled via an elastic body that bends when an impact in the vertical direction is applied.

The elastic body is a plate spring, one end of which is fixed to the base and it is recommended to attach the leg at the front end of the plate spring.

When the laser marker according to the present invention falls, its legs hit a floor surface etc. The leg is coupled with the base via the elastic body that bends when an impact in the vertical direction is applied, and therefore, the elastic body bends due to the impact force applied to the leg, the impact force is absorbed by the elastic body, and the impact force to be transmitted to the gimbal mechanism, the main body case, etc., is reduced. As a result, the damage to the essential parts, such as the gimbal mechanism etc. constituting the laser marker, can be reduced, thus avoiding frequent large-scaled overhauls.

However, even the laser marker according to the present invention is not perfectly impact-resistant just by comprising the above-mentioned characteristics, and there is a limit to the height of fall that does not cause any damage to the essential parts. It is possible, however, to drastically improve the impact resistance by incorporating the buffering structure according to the present invention together with the impact-resistant structure or buffering structure in the conventional laser marker described above.

DESCRIPTION OF THE PREFERRED EMBODIMENTS

Figure 1:
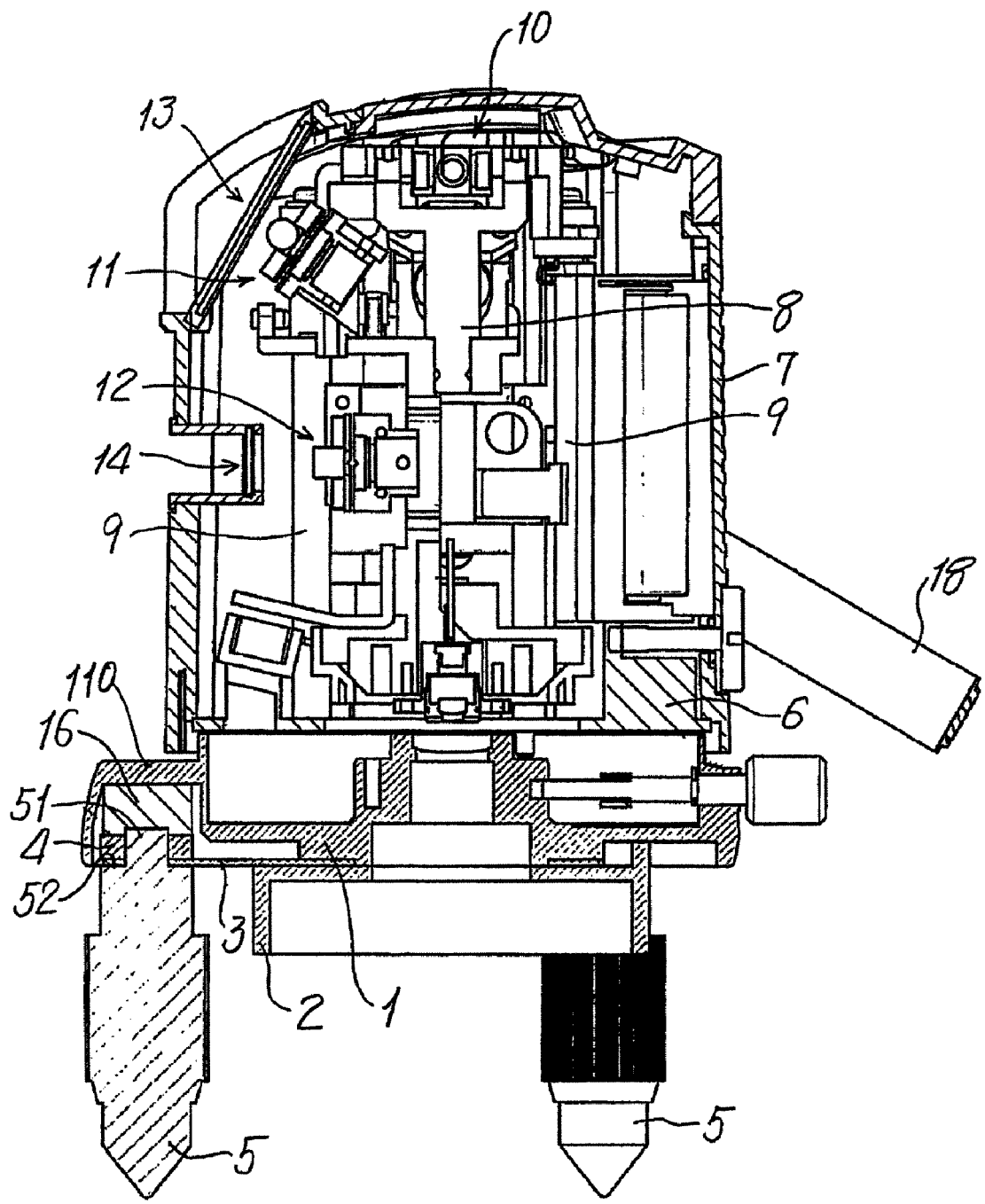
FIG. 1 is a longitudinal section view showing a first embodiment of a laser marker according to the present invention.
Figure 2:
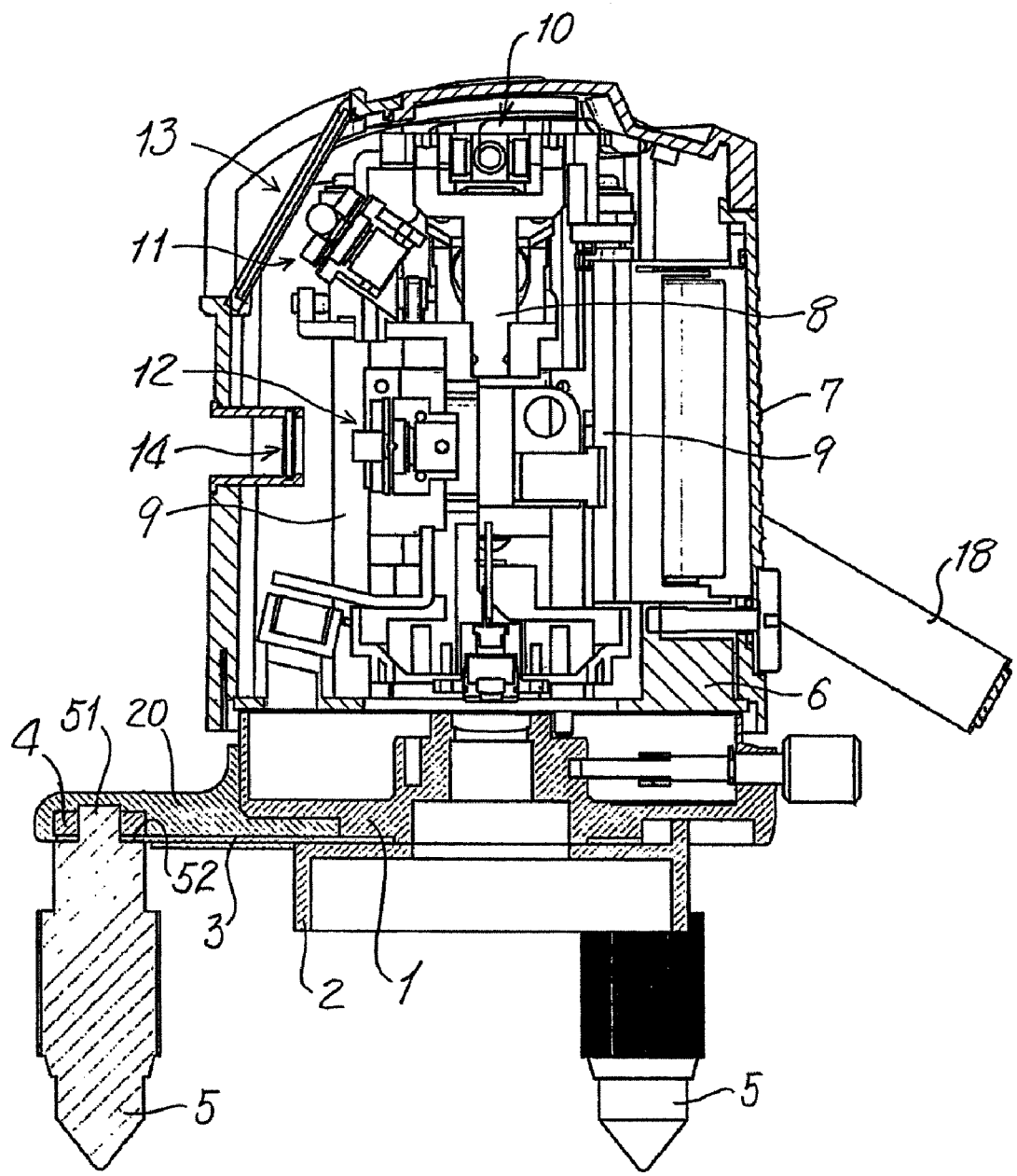
FIG. 2 is a longitudinal section view showing a second embodiment of a laser marker according to the present invention.
Figure 3:
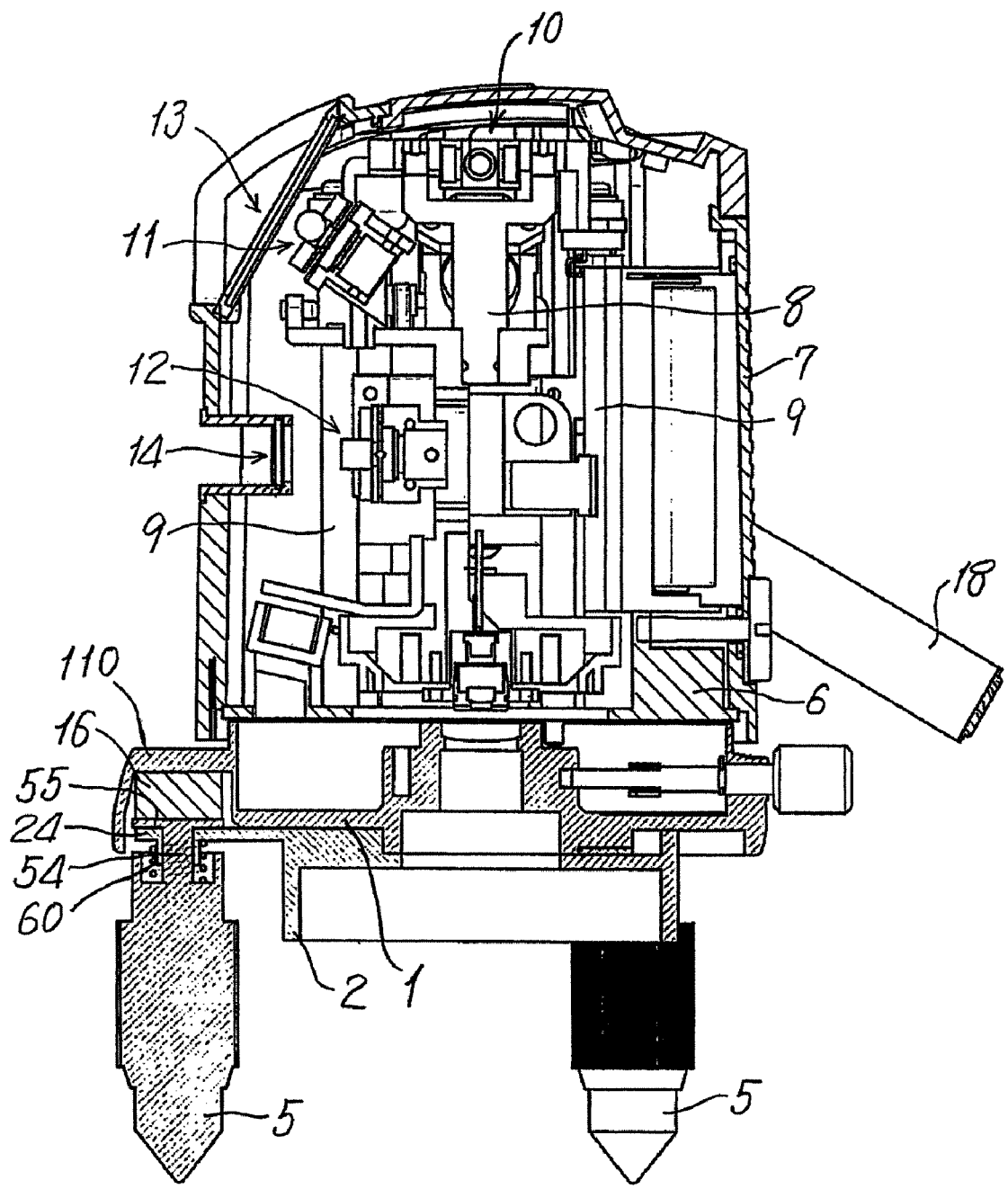
FIG. 3 is a longitudinal section view showing a third embodiment of a laser marker according to the present invention.
Figure 4:
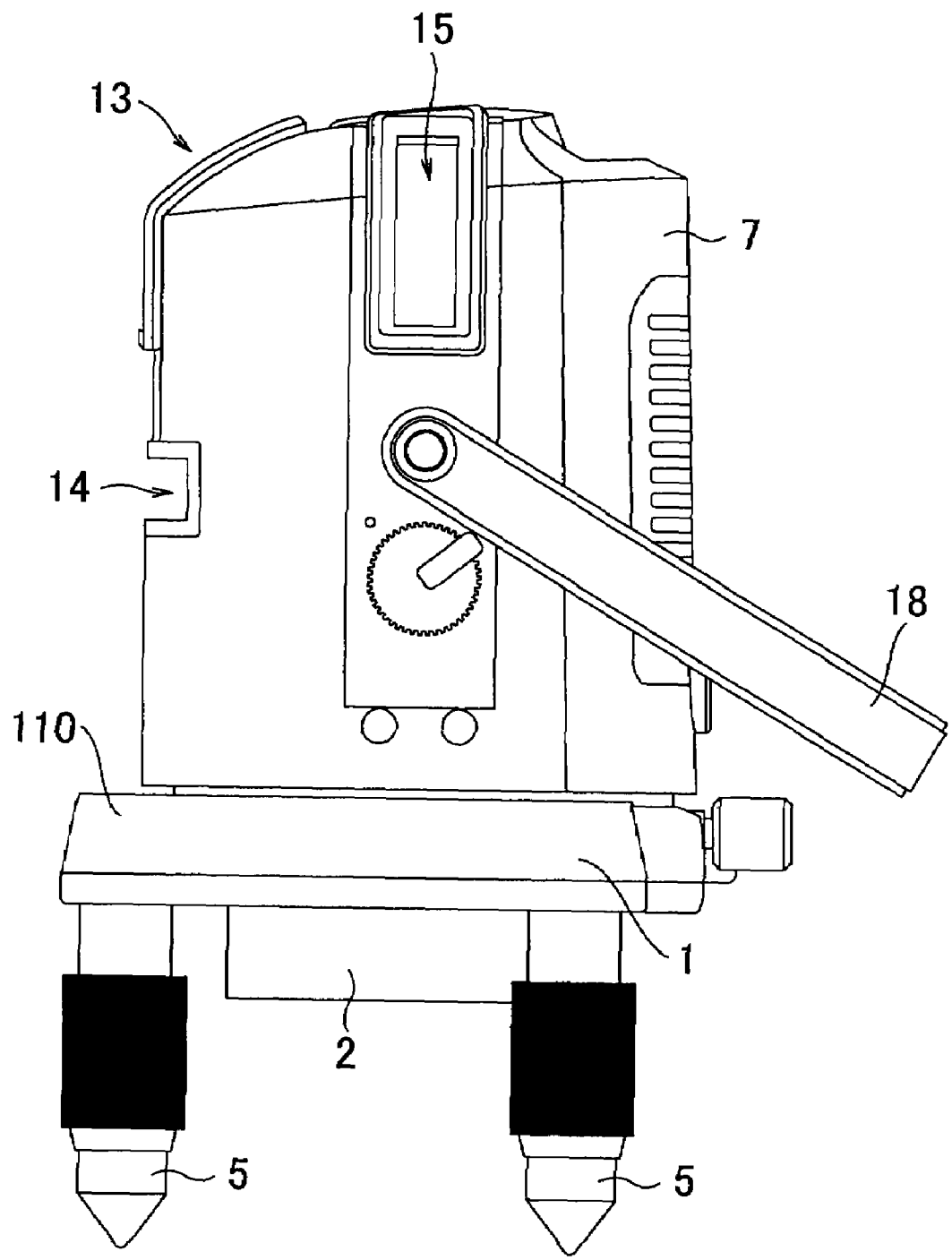
FIG. 4 is an elevation view showing an outside appearance example of a laser marker according to the present invention.

Various embodiments of the laser marker according to the present invention will be described below with reference to the drawings. FIG. 1, FIG. 2, and FIG. 3 are cross-sectional views showing a first embodiment, a second embodiment, and a third embodiment, respectively, and FIG. 4 is an outside appearance elevation view common to the embodiments.

First Embodiment

In FIG. 1, reference number 1 denotes a base of a laser marker. The base 1 has a main body formed into a circular dish shape and on the main body of the base 1, a rotary support base 6 is mounted rotatably in a horizontal plane relative to the base 1 and an appropriate measure to prevent disconnection is applied. The inner surface of the lower end of a main body case 7 of the laser marker is engaged with the rotary support base 6 and the main body case 7 is coupled rotatably along with the rotary support base 6. On the rotary support base 6, essential components unique to the laser marker described below are incorporated in the main body case 7.

On the top surface of the rotary support base 6, an appropriate number of struts 9 are erected. The lower end of each strut 9 is fixed on the rotary support base 6. At the upper end of each strut 9, a gimbal mechanism 10 is supported via an appropriate support. The gimbal mechanism 10 may have a generally known configuration, for example, including a fixed ring substantially integrated with the strut 9, an intermediate ring supported swingably by a first shaft in the horizontal direction on the inner surface side of the fixed ring, and a second shaft in the horizontal direction and perpendicular to the first shaft provided in the intermediate ring. Inside the intermediate ring, a light source unit holder 8 is suspended swingably by the second shaft. As publicly known, even if the base 1 is not installed in a horizontal attitude, it is possible for the light source unit holder 8 to always take a predetermined vertically suspended attitude by the action of the gimbal mechanism 10.

To the light source unit holder 8, a light source unit is attached for projecting a line beam onto the target surface of projection by a laser. In the example shown in FIG. 1, a light source unit 11 for projecting a line beam in the vertical direction onto the target surface of projection is attached to the top of the light source unit holder 8, and a light source unit 12 for projecting a line beam in the horizontal direction is attached to a middle part in the vertical direction of the light source unit holder 8. The light source unit 11 and the light source unit 12 have basically the same configuration, including, for example, a semiconductor laser as a light source, a collimator lens for collecting the divergent beams radiated from the semiconductor laser into a parallel beam flux, and a rod lens for diffusing the parallel beam flux only in one direction. In the light source unit 11, the center axis line of the rod lens is directed in the horizontal direction and in the light source unit 12, the center axis line of the rod lens is directed in the vertical direction. On the main body case 7, an outgoing window 13 from which a laser beam from the light source unit 11 is output toward the outside and an outgoing window 14 from which a laser beam from the light source unit 12 is output toward the outside are provided.

In the conventional laser marker, an appropriate number of legs are attached directly to the bottom of the base 1, however, the present invention is characterized by the attaching structure of a leg 5. In the embodiment shown in FIG. 1, a cover 110 protruding outwardly in the radial direction from the base 1 is formed integrally with the base 1 at a position corresponding to the attachment part of the leg 5. The cover 110 has an open space 16, the lower end of the space is open, and a plate spring 3 as an elastic body extends in the horizontal direction in such a manner as to cover the open lower end surface of the space 16. On the bottom of the base 1, an under-base 2 is fixed in an overlapping manner and one end of the plate spring 3 is sandwiched between the base 1 and the under-base 2 and fixed in between. The plate spring 3 is attached in a state in which one end thereof is supported and at the front end of each plate spring 3, the leg 5 is attached. The upper end of each leg 5 has a small-diameter part and a male thread is formed on the outer surface of the small-diameter part, forming a threaded part 51, and due to the formation of the small-diameter part of each leg 5, a shoulder-shaped step 52 is formed. The threaded part 51 of each leg 5 is inserted into a hole formed in the vicinity of the front end of the plate spring 3 from the lower side, and a nut 4 is screwed and tightened on the threaded part 51 that protrudes from the top surface of the plate spring 3, and thus the plate spring 3 is sandwiched between the shoulder-shaped step 52 of the leg 5 and the nut 4, and the leg 5 is attached to the front end of the plate spring 3.

In this manner, each leg 5 is attached to the plate spring 3 and the top surface of the plate spring 3 is covered with the cover 110 of the base 1, and as a result, the space 16 is formed above the threaded part 51 of the leg 5 attached to the plate spring 3 and the nut 4. In this configuration, if a load is applied upward from below so that the leg 5 is pushed up, the threaded part 51 and the nut 4 at the top end of the leg 5 enters the space 16 while the plate spring 3 bends upward. The bending action of the plate spring 3 brings about an effect to reduce the impact force, and suppresses the impact force, applied to the leg 5, from being transmitted to the gimbal mechanism 10 through the base 1. Because of this, even in the case of an accidental fall while the laser marker is used, if the leg 5 first hits the floor etc., the plate spring 3 absorbs the impact force to prevent or reduce damage to the gimbal mechanism 10.

It may also be possible to arrange an impact absorbing material including, for example, urethane foam, in the space 16 formed between the top end of the leg 5 attached to the plate spring 3 and the cover 110 integrated with the base 1 in opposition to the top end of the leg 5 in the embodiment shown in FIG. 1. In FIG. 1, the impact absorbing material is indicated as the member interposed between the top end surfaces of the leg 5 and the nut 4, and the ceiling surface of the cover 110 and hatched by parallel oblique lines. With such a configuration, the impact absorbing material and the plate spring 3 can share the buffering function and improve the buffering effect.

FIG. 4 shows an outside appearance of the embodiment. According to the outside appearance diagram, there is provided an outgoing window 15 from which another line beam in the vertical direction is output, in addition to the outgoing window 13 from which a line beam in the vertical direction is output. A light source unit corresponding to the outgoing window 15 is attached to the light source unit holder. The line beam in the vertical direction output from the outgoing window 13 and projected, and the line beam in the vertical direction output from the outgoing window 15 and projected, are apart by 90 degrees in the horizontal direction with the reference axis of the laser marker in the vertical direction as center, and when these line beams are projected onto the ceiling surface, they intersect with one another perpendicularly on the ceiling surface. The intersection on the ceiling surface will serve as a reference point.

A handle 18, used when carrying the laser marker, is attached to the main body case 7.

Second Embodiment

Next, a second embodiment shown in FIG. 2 will be described. The structure and inner structure of the main body case 7 are the same as those in the first embodiment except for the buffering structure, and therefore, the buffering mechanism is described mainly. In FIG. 2, the base 1 consists of only a dish-shaped main body, not having the cover 110 in the first embodiment shown in FIG. 1. The base 1 and the under-base 2, fixed to the bottom of the base 1 in an overlapping manner, are provided, and one end of the plate spring 3 is sandwiched and fixed between the base l and the under-base 2. At the front end of the plate spring 3, the leg 5 is attached in the same configuration as that in the first embodiment. Reference numeral 51 denotes the threaded part of the leg 5, 52 denotes the step of the leg 5, and 4 denotes the nut, respectively. To the periphery of the base 1, an impact absorbing material 20 is fixed corresponding to the attachment part of the leg 5. The impact absorbing material 20 includes, for example, a rubber-like elastic body composed of elastomer, that is, a high-polymer material, and its base part is fixed to the base 1. The impact absorbing material 20 extends outwardly in the radial direction from the base 1 and protrudes in the horizontal direction along the top surface of the plate spring 3 and covers the top surface of the plate spring 3, the threaded part 51 of the leg 5 protruding from the top surface of the plate spring 3, and the nut 4.

According to the embodiment shown in FIG. 2, when an impact force is applied to each leg 5, the plate spring 3 and the impact absorbing material 20 bend and absorb the impact force in a sharing manner, and thus, reducing the impact force applied to the gimbal mechanism 10 and other essential components of the laser marker and preventing or reducing damage to the gimbal mechanism 10 and other essential components.

The outside appearance of the embodiment shown in FIG. 2 is substantially the same as that shown in FIG. 4.

Third Embodiment

Next, a third embodiment shown in FIG. 3 will be described. The structure and inner structure of the main body case 7 are the same as those in the first and second embodiments except for the buffering structure, and therefore, the buffering structure will be described mainly. In FIG. 3, the base 1 has a dish-shaped main body as in the first embodiment shown in FIG. 1, and has the cover 110 integrally, which protrudes outwardly in the radial direction from the main body at a position corresponding to the attachment part of the leg 5. In addition, the under-base 2 fixed to the bottom of the base 1 in an overlapping manner has a projection 24 integrally, which extends outwardly in the radial direction at a position corresponding to the attachment part of each leg 5.

Each leg 5 is attached to each projection 24 in a configuration as described below. The part near the top end of the leg 5 has a small-diameter part 54 and a flange 55 is formed at the top end. The small-diameter part 54 of the leg 5 is inserted into a hole formed in the projection 24 of the under-base 2, and the leg 5 is attached so that it can move relative to the under-base 2, and therefore, relative to the base 1, in the vertical direction. In the projection 24, a guide cylinder is formed integrally and continuous with the hole, which is caused to function as a guide hole. In addition, on the periphery of the small-diameter part 54, a coil spring 60 as an elastic body is arranged, and the coil spring 60 biases the leg 5 to the direction that the leg 5 moves downward. The flange 55 of the leg 5 serves as a regulator that regulates the movement of the leg 5 by the biasing force of the coil spring 60 at a predetermined position. In other words, the movement of the leg 5 due to the biasing force is regulated by the contact of the flange 55 with the top surface of the projection 24. The cover 110 of the base 1 is located above the leg 5 and covers the top of the leg 5 and the projection 24. The space 16 is formed between the ceiling surface of the cover 110 and the flange 55 at the top end of the leg 5, and the presence of the space 16 enables the movement of the leg 5 against the biasing force of the coil spring 60.

According to the embodiment shown in FIG. 3, if an impact force is applied to each leg 5, the coil spring 60 compresses to absorb the impact force, reduce the impact force applied to the gimbal mechanism 10 and other essential components of the laser marker, and therefore preventing or reducing damage to the gimbal mechanism 10 and other essential components.

The outside appearance of the embodiment shown in FIG. 3 is substantially the same as that shown in FIG. 4.

It may also be possible to arrange an impact absorbing material including, for example, urethane foam, in the space 16 formed between the ceiling surface of the cover 110 and the flange 55 at the top end of the leg 5 in the embodiment shown in FIG. 3. In FIG. 3, the impact absorbing material is indicated as the member interposed between the top end surfaces of the flange 55 of the leg 5 and the ceiling surface of the cover 110 and hatched by parallel oblique lines. With such a configuration, the impact absorbing material and the coil spring 60 can share the buffering function and improve the buffering effect.

What is claimed is:

1. A laser marker comprising:
   a main body case including a gimbal mechanism, a light source unit holder suspended swingably by the gimbal mechanism, and a light source unit attached to the light source unit holder and outputting a projection line beam;
   a base supporting the main body case; and
   a plurality of legs provided at the bottom of the base and supporting the base,
   the base and the each leg being coupled via an elastic body that bends when an impact in the vertical direction is applied.

2. The laser marker according to claim 1,
   wherein the elastic body is a plate spring one end of which is fixed to the base, and the leg is attached to the front end of the plate spring.

3. The laser marker according to claim 2,
   wherein the top surface of the plate spring is covered with a cover integrated with the base, and in a space formed between the top end of the leg attached to the plate spring and the cover facing the top end of the leg, an impact absorbing material is interposed between the ceiling surface of the cover and the top end surface of the leg.

4. The laser marker according to claim 2,
   wherein one end of the plate spring is sandwiched and fixed between the base and an under-base fixed to the lower surface of the base in an overlapping manner.

5. The laser marker according to claim 2,
   wherein the leg is attached to the front end of the plate spring by sandwiching the plate spring by a shoulder-shaped step formed at the top end and a nut screwed on a threaded part of the leg, which protrudes from the top surface of the plate spring.

6. The laser marker according to claim 5,
   wherein the top surface of the plate spring, the threaded part of the leg, which protrudes from the top surface of the plate spring, and the nut are covered with an impact absorbing material and the base part of the impact absorbing material is fixed to the base.

7. The laser marker according to claim 6,
   wherein the impact absorbing material includes elastomer.

8. The laser marker according to claim 1,
   wherein each leg is attached so that it can move in the vertical direction relative to the base, the elastic body includes a coil spring that is arranged on each leg and biases each leg to the direction that the leg moves downward, and a regulator is provided, which regulates the movement of the leg due to a biasing force of the coil spring at a predetermined position.

9. The laser marker according to claim 8,
   wherein the regulator includes a flange provided at the top end of each leg.

10. The laser marker according to claim 9,
    wherein the top surface of the plate spring is covered with a cover integrated with the base, and in a space formed between the top end of the leg attached to the plate spring and the cover facing the top end of the leg, an impact absorbing material is interposed between the ceiling surface of the cover and the top end surface of the leg.

* * * * *